Dec. 11, 1956  F. G. DUNNINGTON  2,774,036
COMPLEX WAVE ANALYZER
Filed May 6, 1946  5 Sheets-Sheet 1

FIG. 1.

INVENTOR
FRANK G. DUNNINGTON
BY
ATTORNEY

Dec. 11, 1956 F. G. DUNNINGTON 2,774,036
COMPLEX WAVE ANALYZER
Filed May 6, 1946 5 Sheets-Sheet 3

INVENTOR
FRANK G DUNNINGTON
BY
M. O. Hayes
ATTORNEY

FIG. 8.

Dec. 11, 1956  F. G. DUNNINGTON  2,774,036
COMPLEX WAVE ANALYZER
Filed May 6, 1946  5 Sheets-Sheet 5

INVENTOR
FRANK G. DUNNINGTON

BY M. A. Hayes
ATTORNEY

2,774,036

COMPLEX WAVE ANALYZER

Frank G. Dunnington, New Brunswick, N. J., assignor, by mesne assignments, to the United States of America as represented by the Secretary of the Navy Application May 6, 1946, Serial No. 667,503

9 Claims. (Cl. 324—77)

This invention relates to electrical apparatus for the analysis of complex electrical waveforms, and in particular to an improved frequency indicator for responding to the predominant frequency present in such a waveform and for detecting and indicating the presence in significant strength of coexistent frequencies subharmonically related to the said predominant frequency.

This application is a continuation-in-part of my co-pending application entitled "Frequency Indicator," Serial No. 635,787, filed December 18, 1945.

The co-pending application, hereinafter referred to as the parent application, discloses various forms of apparatus useful in analyzing the information contained in radar pulse echoes received from aircraft having propeller blades specially treated as described. This information comprises certain fundamental and subharmonic audio frequency component signals which are introduced in the envelope of the radar pulse echoes by the phenomenon of propeller modulation. It is the task of the form of the apparatus illustrated in the parent application to detect and indicate the amount of said subharmonic component relative to the amplitude of said fundamental component.

Although the performance of the above identified indicator type is quite satisfactory for many applications, a definite limitation arises when the equipment is used to analyze signals having a certain characteristic. Specifically, when the fundamental and subharmonic frequency components to be analyzed result from propeller modulation of radar echoes by an aircraft in rapid motion, difficulty is encountered by the equipment in determining the relative amount of the subharmonic frequency component present. Due to its motion, the aircraft under observation experiences random changes in aspect. It has been found that such changes cause the time phase relation between the fundamental frequency component and the subharmonic frequency component to also vary in a random manner.

Figure 2:
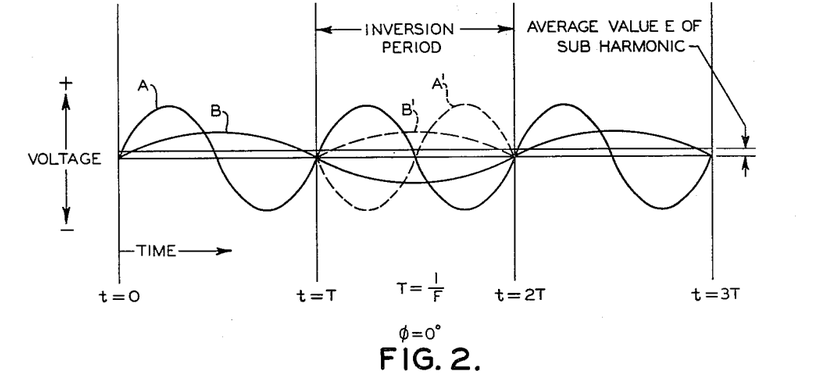
Figs. 2, 3, 4, 5 and 6, 7, 8 illustrate certain voltage waveform relations useful in explaining the operating principles of the present invention.

Referring to Fig. 2 it will be recalled that waveforms A and B represent respectively a fundamental component of frequency F and a subharmonic component of frequency
$$\frac{F}{2}$$
The basic technique for measuring the
$$\frac{F}{2}$$
component comprises inverting the input signal during alternate cycles of the fundamental component, F, and averaging the resultant voltage waves. Thus the average value of the fundamental component remains zero, but that of the subharmonic component does not necessarily remain zero. For the particular phase relation between waveforms A and B illustrated in Fig. 2 the resulting average value of the switched subharmonic component is positive as shown and is proportional to the relative amplitude of the
$$\frac{F}{2}$$
subharmonic component. The switching action is controlled by square wave generators 514 and 516 which in turn are synchronized to the fundamental frequency component F. If the phase relation between waveforms A and B is different from the one illustrated, the average value of the switched subharmonic will also be different from that shown and may even become zero or negative. For example, if the subharmonic component should lag the position shown by a quarter cycle of the subharmonic frequency, i. e., waveform B displaced to the right by an amount
$$\frac{T}{2}$$
the average value of the switched subharmonic will become zero. That is, for this situation the inversion or switching operation is not performed at the proper points in the subharmonic component cycle. Hence, a true indication of the actual amount of the subharmonic component present will not be given. In general, then, if the phase relation between fundamental and subharmonic components departs substantially from that shown in Fig. 2, the average value obtained will not be indicative of the amount of subharmonic present in the incoming signal. The particular phase relation of Fig. 2 has been chosen as a basis for calibration since it yields the maximum average value of switched subharmonic component. Similar reasoning may be applied to the problem of detecting other subharmonic components and the same difficulty will be met.

The above limitation was anticipated by the above application and means were incorporated in that system to compensate for the above-described phase variation. However, the apparatus employed for performing this correction was of the manual type and, consequently, it could not follow rapid variations in the phase displacement between the fundamental and subharmonic compounds.

Accordingly, it is an object of the present invention to provide a means for overcoming the aforementioned difficulties.

It is another object of the present invention to provide circuits which automatically respond to and substantially compensate for variations of phase between the fundamental and subharmonic frequency components of a given signal.

A further object of this invention is to provide in an apparatus for analyzing a complex voltage waveform containing fundamental and subharmonic frequency components, a means for eliminating said fundamental component but not a predetermined subharmonic component, and means for producing an indication of the amount of said subharmonic component which is substantially independent of any phase variation between the fundamental and subharmonic components.

These and other objects and features of my invention will become apparent upon examination of the following specification when taken with the accompanying drawings, of which.

Figure 1:
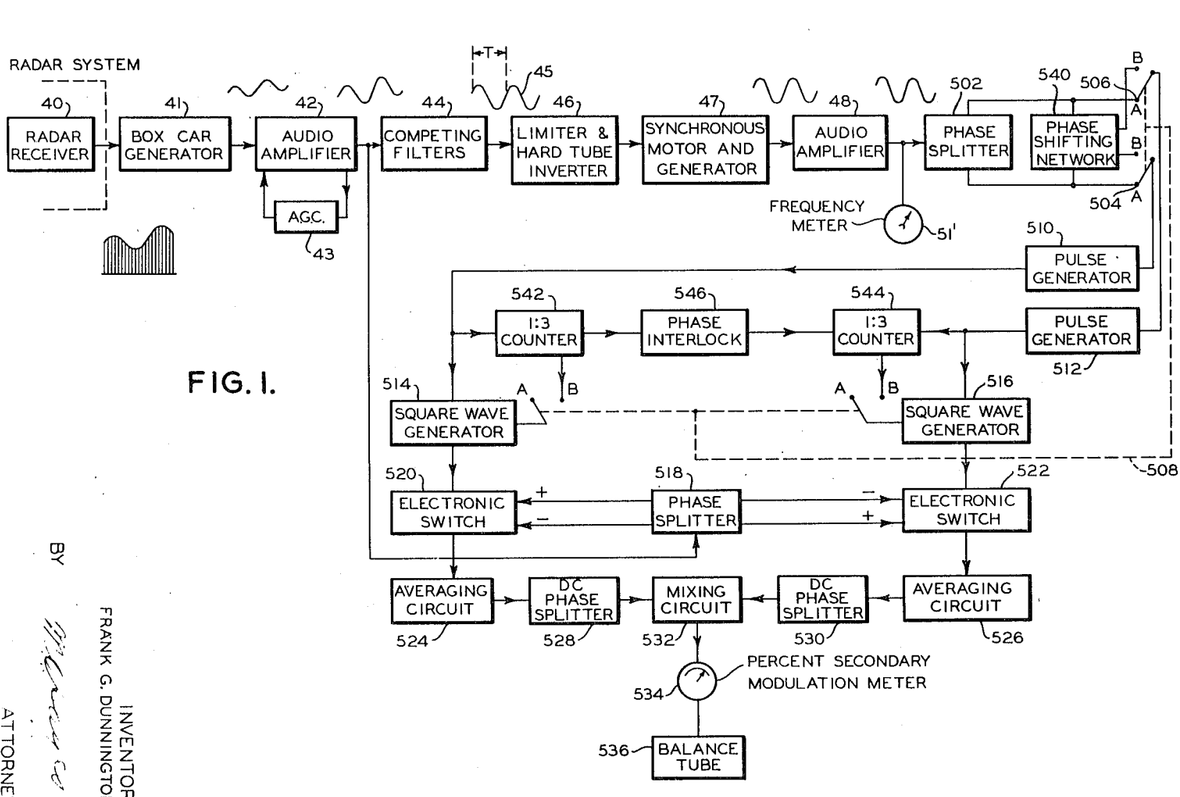
Fig. 1 is a block diagram embodying the present invention.

Referring now to Fig. 1, the fundamental and subharmonic modulation frequencies present in the envelope of the echo pulses received by the radar receiver 40 are detected by a box car generator 41, and the resulting output is applied to an audio amplifier 42 controlled by a strong automatic gain control circuit 43. The generator 41 which is herein designated as a "box car" circuit is essentially a detector circuit wherein a storage device is charged to a potential equal to the amplitude of pulses applied thereto and holds that potential on the storage device until the next successive pulse is applied at which time the storage device will assume the potential of the last applied pulse. In the present application, therefore, the output of the "box car" circuit is essentially the envelope of the pulses applied to the circuit, the envelope herein being a voltage wave consisting of a fundamental frequency and frequencies which are subharmonic to this fundamental frequency. The audio amplifier output is then fed to a set of parallel competing filters 44 which reject the subharmonic frequencies present in the signal and pass only the fundamental frequency component to the limiter and hard tube inverter stage 46. The synchronous motor generator combination 47 provides additional filtering and imparts memory to the fundamental frequency component substantially as follows: The fundamental frequency is applied to the field winding of synchronous motor 47 whose rotor is mechanically coupled to the input shaft of an alternating current generator. The design of the motor-generator combination is such that the frequency of the alternating voltage delivered by the generator is the same as that of the signal driving the synchronous motor. It is evident from the nature of such a device that the generator output will contain essentially only the desired fundamental frequency of the input signal since the other relatively small frequency components will not affect the average speed of the motor. A flywheel attached to the generator shaft provides inertia for the combination. Hence, if the received modulated radar echo should fade momentarily, the generator would continue to provide an output for the brief period until the signal returns. Thus, the device can be said to possess memory for short time intervals. Thus the output of audio amplifier 48 consists of a practically pure sine wave of voltage at the fundamental frequency F, which is indicated in cycles per sec. by the frequency meter 51'. This particular signal ultimately controls the operation of electronic switches 520 and 522. The output of audio amplifier 42 contains the fundamental frequency component F and a subharmonic frequency component $$\frac{F}{2}, \frac{F}{3} \text{ etc.}$$

These voltage waves are stabilized with respect to the amplitude of the fundamental component and constitute the signal to be analyzed by the remaining elements of Fig. 1.

The basic technique employed in the present invention of obtaining a voltage proportional to the relative amplitude of the subharmonic frequency component is generally similar to that of the apparatus disclosed in the parent application. That is, the modulation voltages received during one period, T, of the fundamental frequency F are averaged with the inversion of those received during a successive period or periods of the fundamental frequency, so that voltages of this frequency are cancelled leaving only those of subharmonic frequency.

The means for accomplishing the inversion operation are similar to those disclosed in the parent application in that they comprise square wave generators synchronized to the fundamental frequency F which cause electronic switches to accept alternately the erect and inverted outputs of a phase splitting circuit receiving the signal to be analyzed. In the present invention, however, the two square wave generators are operated jointly when a signal containing a given subharmonic component is to be detected. For reasons hereinafter described, the square wave generators are not triggered simultaneously but are staggered by a definite time interval. This time interval is made equal to a predetermined fraction of a cycle of the subharmonic frequency component under consideration.

Returning now to Fig. 1, the output of audio amplifier 48 is applied to a phase splitting circuit 502 which delivers to terminals 504 and 506 two sinusoidal voltage waves at the fundamental frequency F, 180° out of phase. If it is desired that the equipment measure the amount of the particular subharmonic $$\frac{F}{2}$$

(or multiples of this frequency) present in the original signal, the switch 508 is placed in position A as shown. The aforementioned waves are thus fed to the pulse generators 510 and 512 respectively. Pulse generator 510 provides one sharp positive trigger for each cycle of its input signal. The resulting series of triggers control square wave generator 514 which is preferably of the Eccles-Jordan type, causing it to undergo one alternation for each trigger received. The output of square wave generator 514 consists therefore of a symmetrical square wave of half period equal to the period T of the fundamental frequency F. By a similar process the square wave generator 516 is caused by the pulse generator 512 to produce a second symmetrical square wave similar to the first. This second square wave is, however, displaced in time with respect to the first square wave by an amount $$\frac{T}{2}$$

due to the phase difference of the input signals to the pulse generators. It should be noted that the relative displacement $$\frac{T}{2}$$

corresponds to exactly one quarter cycle (90 electrical degrees) of the subharmonic frequency $$\frac{F}{2}$$

The foregoing operation of the square wave generators will hereinafter be referred to as staggered 1:1 switching.

The output signal of audio amplifier 42, containing the fundamental component F and the subharmonic component $$\frac{F}{2}$$

is coupled to the phase splitter 518 which supplies to each of the electronic switches 520 and 522 the original signal unchanged in phase and also the original signal inverted in phase, i. e., effectively shifted by 180°. Square wave generator 514 causes electronic switch 520 to pass alternately these two phases of the signal to the averaging circuit 524.

Considering now Fig. 2, waveform A represents the voltage variation of the fundamental frequency component F with time and waveform B represents that of the subharmonic component with time. It is evident that inversion of the fundamental and subharmonic components during alternate periods of the fundamental (which are designated as A' and B', respectively) will cause the average of the switched fundamental component to remain zero but that of the switched subharmonic component will, for the particular phase relation illustrated of the two components ($\phi=0$), acquire a positive value E as shown.

Thus the output of the averaging circuit 524 is a D. C. voltage which is proportional to the amplitude of the subharmonic component. Since the signal to be analyzed has been stabilized with respect to the amplitude of the fundamental component by the AGC circuit 43 it is clear that this D. C. voltage is proportional to the amount of the subharmonic component relative to that of the fundamental component.

Figure 3:
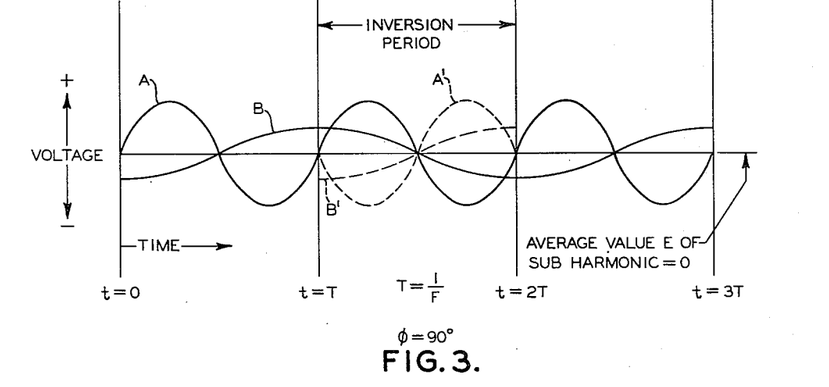
Figure 4:
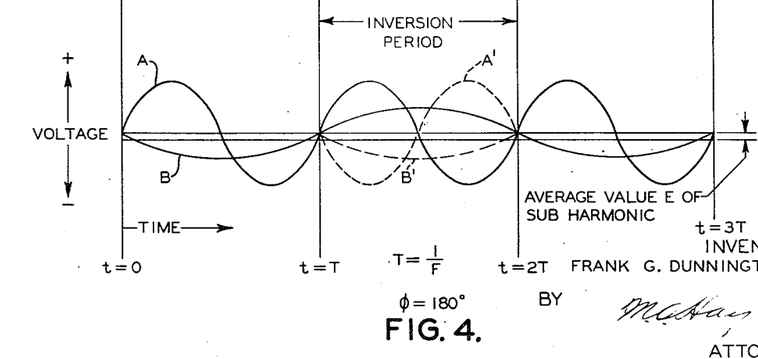
Figure 5:
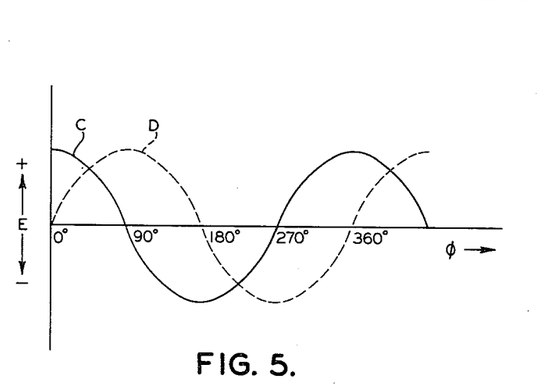

If the phase difference $\phi$ between the fundamental and subharmonic components is not constant, but varies due to the changing aspect of the aircraft target under observation as previously described, the resultant average value E will not necessarily be proportional to the amplitude of the subharmonic component. The variation of E is brought out more clearly in Figs. 3 and 4 which shows the effect of performing the switching or inversion operation on signals having respectively a phase difference of 90° and 180° of a cycle of the subharmonic frequency. It is important to note that the designation of $\phi$ in electrical degrees refers to a fraction of a cycle of the subharmonic frequency. Thus in Fig. 3 it is evident that the average value E of the switched subharmonic component becomes zero. In Fig. 4 the average value E is negative. Fig. 5 shows the general behavior of the average value E as the phase difference $\phi$ is varied. Waveform C indicates the variation produced at the output of averaging circuit 524 of Fig. 1.

The action of electronic switch 522, square wave generator 516 and averaging circuit 526 upon the second pair of outputs from the phase splitter 518 is exactly similar to the corresponding circuits described except that due to the time displacement between the outputs of the square wave generators the subharmonic component arriving at electronic switch 522 is inverted or gated during a different portion of its cycle. The resultant average value voltage appearing at the output of averaging circuit 526 will also depend upon the phase relation $\phi$ between the fundamental and subharmonic components but the operating periods of electronic switches 520 and 522 are staggered by an interval equal to one quarter cycle of the subharmonic frequency. It can be readily shown that the magnitude of this voltage for a given value of $\phi$ will correspond to the magnitude of the output voltage of averaging circuit 524 for a value of $\phi$ which is 90 electrical degrees (of the subharmonic cycle) away from the said given value. Consequently, the phase variation of the output of averaging circuit 526 is that indicated by the dotted waveform D of Fig. 5.

Figure 6:
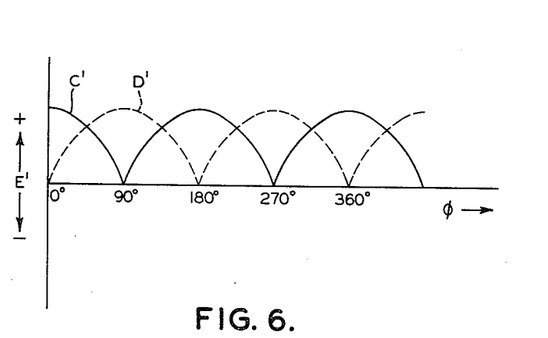
Figure 7:
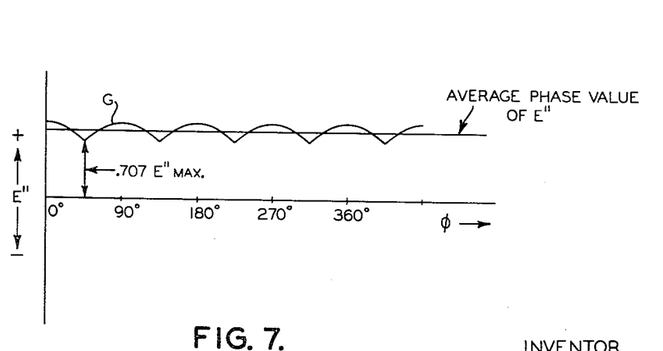

In Fig. 1 the outputs of the averaging circuits 524 and 526 are applied through D. C. phase splitters 528 and 530 to a mixing circuit 532. Each D. C. phase splitter serves to provide two voltages of opposite polarity whose magnitudes are proportional to the magnitude of the applied voltage. The mixing circuit 532 is of such a design that its output voltage is always proportional to the largest of its input voltages. Referring now to Fig. 6, if the mixing circuit 532 receives signals from only one of the D. C. phase splitters, say 528, its output voltage E' would vary with the phase difference $\phi$ in the manner shown by curve C'. If, on the other hand, the output of the mixing circuit were due only to signals being received from the other D. C. phase splitter 530 it would vary with $\phi$ according to curve D'. When both circuits feed signals simultaneously to the mixing circuit, as they do in the normal operation of the invention, its output voltage can vary only along the upper boundaries of the two curves. Thus the actual mixing circuit output E", as shown in Fig. 7, varies with $\phi$ only slightly as indicated by curve G. From the fundamental properties of a sine wave it is evident that the minima of E" are theoretically .707 of the maxima. It is evident then that the deviation of E" from its average value is only approximately ±15%. The output of the mixing circuit is measured by the meter 534 in cooperation with the balance tube 536, the three elements comprising a type of bridge circuit. The balance tube 536 permits adjustment of the voltage across meter 534 to facilitate calibration of the equipment. The meter 534 indicates the percentage of secondary modulation and, for the practical purposes of the invention, this reading is substantially independent of phase variations, even though they occur in a completely random manner.

The foregoing description of the operation of the invention was confined to the problem of detecting the $$\frac{F}{2}$$

subharmonic. The mode of operation for the case of the $$\frac{F}{3}$$

subharmonic and its submultiples will now be discussed. The $$\frac{F}{3}$$

subharmonic cannot be detected by 1:1 switching, but must employ 1:2 switching for this purpose. That is, there must be developed an asymmetrical square voltage wave whose successive half periods are equal to the period T of the fundamental frequency and 2T respectively.

In the present invention, the square wave generators 514 and 516 of Fig. 1 must likewise develop asymmetrical square waves of the character described but must also be staggered in their operation to compensate for the effect of phase variation for reasons previously described.

Although Fig. 5 was developed in the discussion of the detection of the $$\frac{F}{2}$$

subharmonic it can be used for any subharmonic provided the abscissa values are understood to refer to the cycle of the particular subharmonic under consideration. It will be further evident from consideration of Figs. 5, 6, and 7 that the 90 degree phase interval chosen as the predetermined fraction of the subharmonic cycle by which the square wave generators 514 and 516 are staggered is the optimum value for obtaining minimum variation of E". In the case of the $$\frac{F}{3}$$

subharmonic this interval is equivalent to 270 electrical degrees of the fundamental frequency F. Hence it is necessary that the square wave generators produce asymmetrical square waves staggered by this amount. These signals are produced by the cooperation of the phase shifting network 540, the 1:3 countercircuits 542 and 544 and the phase interlock circuit 546 with the square wave generators 514 and 516 of Fig. 1.

Figure 8:
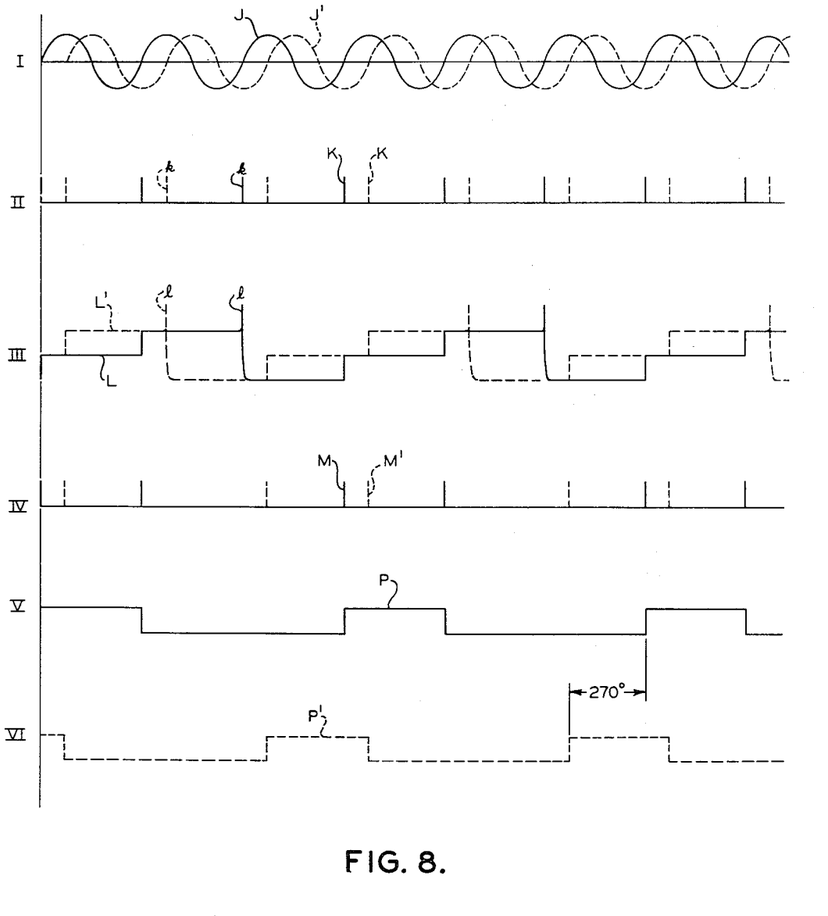

In Fig. 1 the selector switch 508 must be placed in position B to prepare the circuits for detection of the $$\frac{F}{3}$$

subharmonic component. The output of the phase shifting network 540 provides two voltages of frequency F which differ in phase by one quarter cycle of F or 90 electrical degrees. These two signals are applied through switch 508 to the pulse generators 510 and 512 and are designated as waveforms J and J' in line I of Fig. 8. The outputs of the pulse generators 510 and 512, consisting of sharp positive pulses K and K' shown in line II of Fig. 8, are coupled to the square wave generators 514 and 516 respectively and also the 1:3 countercircuits 542 and 544 respectively.

The countercircuit 542 undergoes a stepwise voltage change as successive pulses are received from pulse generator 510. This voltage change is shown as waveform L in line III of Fig. 8. It will be noted that when this voltage attains the third "step" as at $l$ the circuit reverts to its quiescent state. At this same instant a negative pulse (not shown) is sent from countercircuit 542 to the input of square wave generator 514, nullifying the effect of the positive pulse $k$ of line II arriving there at that time. Consequently, the square wave generator 514 is triggered by only the sequence of pulses shown as M in line IV. As a result, its output consists of the asymmetrical square wave P of line V. Since the interval between the positive pulses K of line II is exactly equal to the period T of the fundamental component F it is apparent that the asymmetrical square wave P is of the character required, i. e., its successive half periods are T and 2T respectively.

The countercircuit 544 controls the synchronization of square wave generator 516 by a process exactly similar to the above. Since, however, the series of pulses K′ arriving from pulse generator 512 lag pulses K by 90 electrical degrees of the fundamental frequency F it is obvious that countercircuit 544 will lock in at different times than countercircuit 542. The desired type of synchronization for countercircuit 544 is illustrated as waveform L′ in line III of Fig. 8. If the two countercircuits were allowed to operate independently any one of three possible types of synchronization might be obtained. To remove such an ambiguity countercircuit 542 is coupled through phase interlock circuit 546 to countercircuit 544 in such a way that a positive pulse developed by countercircuit 542 at instant of its discharge at $l$ forces countercircuit 544 to be in its quiescent state at that time.

Thus countercircuit 544 "knocks out" every third corresponding pulse $k'$ from the series of pulses K′ and permits only the particular sequence of pulses M′ in line IV of Fig. 8 to trigger square wave generator 516. As a result, this square generator develops the asymmetrical square wave P′ shown in line VI of Fig. 8. An inspection of the waveforms of Fig. 8 will reveal that due to the synchronization described above, the square waves P and P′ are staggered by three quarters of the period T of the fundamental frequency F, i. e., 270 electrical degrees. As stated previously this staggering interval is exactly equal to 90 electrical degrees of the $$\frac{F}{3}$$

subharmonic.

The operation of the remaining circuits of the present invention in detecting the $$\frac{F}{3}$$

subharmonic is exactly analogous to their operation in detecting the $$\frac{F}{2}$$

subharmonic as previously described. Thus it is clear that when the invention is used to analyze a signal containing the $$\frac{F}{3}$$

subharmonic component (or its submultiples) the indication of meter 534 will be proportional to the relative amount of this component and substantially independent of any variations of phase between it and the fundamental frequency component.

Figure 9:
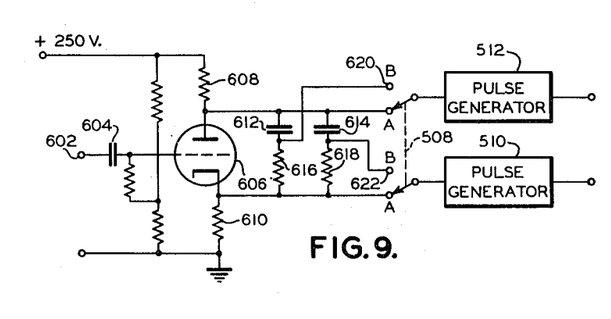
Fig. 9 is a schematic diagram of certain portions of the block diagram of Fig. 1.

Referring to Fig. 9, there are shown details of the phase splitter 502 and phase shifting network 540 of Fig. 1. The output of audio amplifier 48 of Fig. 1 which consists of a sinusoidal voltage wave at the frequency F is applied to terminal 602 of Fig. 9 and coupled via condenser 604 to the grid of electron tube 606. The outputs of tube 606 which are developed across resistors 608 and 610 are effectively 180° out of phase with each other and are applied as shown to the phase shifting network comprising condensers 612 and 614 and resistors 616 and 618. The output signals of this network are derived from the junctions of condenser 612 and resistor 616 and condenser 614 and resistor 618 respectively and are applied to the terminals 620 and 622 of selector switch 508 as shown. The elements constituting the phase shifting network determine the magnitude of the phase shift produced between the voltages arriving at terminals 620 and 622 and should be designed to have certain preferred values to yield the desired phase shift of 90 electrical degrees. In general it is desirable that the combination of condenser 612 and resistor 616 have a time constant which is approximately seven times that of the combination of condenser 614 and resistor 618. For the range of propeller modulation fundamental frequencies ordinarily encountered with conventional aircraft, i. e., approximately thirty to ninety cycles per second, these values may be typically as follows: condenser 612, .05 microfarad; condenser 614, .01 microfarad; resistor 616, 177,000 ohms; and resistor 618, 126,000 ohms. These values are merely illustrative and considerable variation may be made in them by those versed in the art without departing from the spirit of the invention. When selector switch 508 is in position B the output signals of the phase shifting network, now differing in phase by 90 electrical degrees, are applied separately to the identical pulse generators 510 and 512. The latter circuits may be any one of several types which convert a sinusoidal voltage into a series of sharp positive voltage pulses, one occurring each cycle of the input voltage. Such a circuit may be comprised of a series of squaring amplifiers and suitable differentiating circuits. The sequence of pulses obtained at the outputs of pulse generators 510 and 512 are used to operate the square wave generators of Fig. 1 in a manner previously described for the detection of the $$\frac{F}{3}$$

type subharmonic. If the selector switch 508 is placed in position A it is apparent that the two pulse generators will be operated by sinusoidal voltages 180 electrical degrees out of phase and thus produce the pulse sequence required for the detection of the $$\frac{F}{2}$$

type subharmonic.

Figure 10:
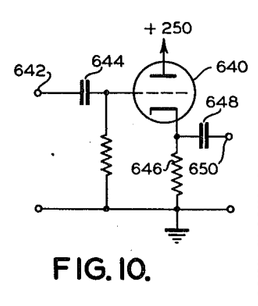
Fig. 10 is a schematic diagram of a particular circuit of Fig. 1.

Coming next to Fig. 10, electron tube 640 and its associated elements represents a preferred design of the phase interlock circuit 546 of Fig. 1. As previously described, this circuit provides a means for interlocking the countercircuits 542 and 544 of Fig. 1 to insure proper synchronization.

Terminal 642 receives a positive pulse from the countercircuit 542 each time that circuit fires on every third pulse received from pulse generator 510. This positive pulse is coupled via condenser 644 to the grid of electron tube 640. The resulting positive pulse developed across the cathode resistor 646 is then coupled via condenser 648 to the output terminal 650. Terminal 650 is connected to the countercircuit 544 of Fig. 1. By the action described above the positive pulse arriving at terminal 650 insures that countercircuit 544 is in its quiescent state at that time. Thus the two countercircuits are effectively interlocked to provide the proper synchronization as shown in Fig. 8.

Figure 11:
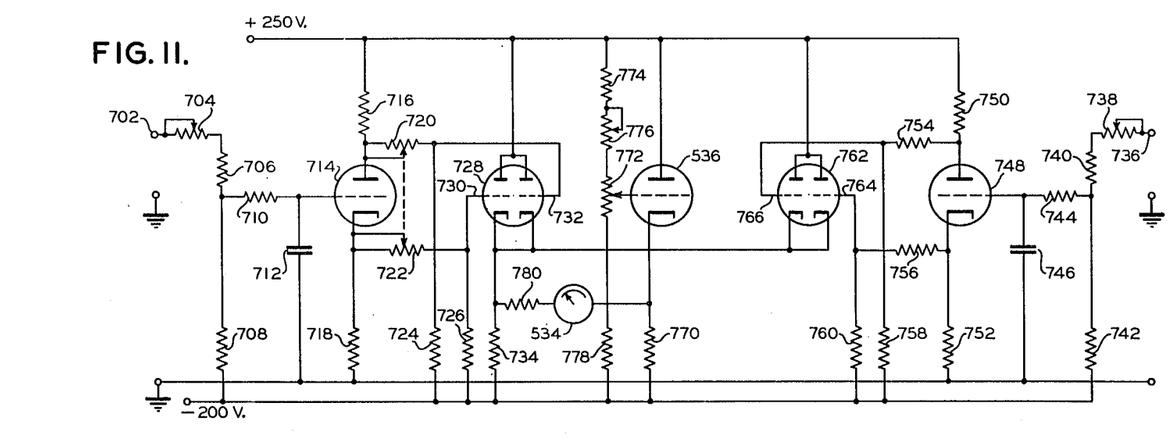
Fig. 11 is a schematic diagram of certain other portions of Fig. 1.

Considering Fig. 11, there are shown details of the averaging circuits 524 and 526, the D. C. phase splitters 528 and 530, mixing circuit 532, meter 534 and balance tube 536. The primary function of these circuits is to compare the D. C. averages of the alternating signals arriving at terminals 702 and 736 from electronic switches 520 and 522 respectively and develop an output voltage substantially proportional to the larger of these D. C. averages. The magnitude of this output voltage as registered by meter 534 is thus proportional to the relative amount of subharmonic component present in the original signal to be analyzed and is substantially independent of any phase variation occurring between the fundamental and subharmonic frequency components.

As illustrated in Fig. 11, the right hand terminal D. C. meter 534 is connected to the cathode of a balanced tube, or reference circuit cathode follower 536. The plate of tube 536 is directly connected to the positive voltage source (+250 volts) and the cathode is returned to a negative voltage source (—200 volts) through load resistor 770. The current through cathode follower 536 and therefore the potential at its cathode is determined by the grid potential applied. This grid potential is obtained from a tap on a voltage divider comprising fixed resistors 774 and 778 and variable resistors 776 and 772 all connected in series between the positive and negative voltage supplies. By the adjustment of the variable taps of potentiometers 772 and 776, the potential at the right hand terminal of meter 534 is adjusted to a standard value, preferably such that the meter reads zero when zero signal is applied at terminals 702 and 736. The left hand terminal of D. C. meter 534 is energized through multiplier resistor 780 from the output of a mixing circuit comprising electron tubes 728 and 762 and associated circuit elements in Fig. 11 and corresponding to mixing circuit 532 illustrated in Fig. 1. The mixing circuit electron tubes 728 and 762 are energized by the output of D. C. phase splitter tubes 714 and 748, respectively, which in turn are energized from input terminals 702 and 736, respectively.

The circuit of Fig. 11 is essentially symmetrical about the balance tube 536, and the operation will now be explained with reference first to the left-hand half. The signal input applied at terminal 702 is connected across a resistor voltage divider comprising fixed resistors 706 and 708 and variable resistor 704 between terminal 702 and the negative power source. A portion of the input signal taken at the junction of resistors 706 and 708 is applied to an averaging circuit, comprising resistor 710 and capacitor 712, and corresponding to the averaging circuit 524 illustrated in Fig. 1. The potential appearing across capacitor 712 is applied to the control grid of the D. C. phase splitter 714. The plate of phase splitter vacuum tube 714 is connected to the positive power source through plate load resistor 716 and the cathode thereof is returned to ground through cathode resistor 718. Output signals are taken from both plate and cathode through variable resistors 720 and 722, respectively, and applied to the grids 732 and 730 of the mixing circuits electron tube 728. The plates of mixing tube 728 are connected together and to the positive power source. The cathodes are also connected in parallel and returned to the negative power source through resistor 734.

The right-hand half of the circuit of Fig. 11, as previously mentioned, is the same as the left-hand half described immediately above. Thus, the circuit includes an input voltage divider from terminals 736, an averaging circuit comprising resistor 744 and capacitor 746, a D. C. phase splitter tube 748 and an electron tube 762 of the mixing circuit. The two cathodes of electron tube 762 are tied together and to the cathodes of mixing electron tube 728.

In operation of the circuit of Fig. 11, if the D. C. averages of the potentials applied at terminals 702 and 736 are equal then the current through the load resistor 734 common to the four cathodes of mixing tubes 728 and 762 will be at a value proportional to either input voltage. If either of the signals applied at terminals 702 and 736 has a D. C. average which is larger than the other, the current though load resistor 734 will change the potential applied to the left-hand terminal of meter 534, relative to the reference potential at the cathode of electron tube 536. The D. C. meter 534 will in this manner indicate a value which is proportional to the larger of the D. C. averages of the two input signals.

It is believed that the circuits of this invention, their operation, and advantage thereof will be apparent from the foregoing detailed description. Since various modifications of the principles herein disclosed will be apparent to those skilled in the art, this invention is to be limited only by the spirit and scope of the following claims.

What is claimed is:

1. Apparatus for analyzing a composite voltage wave containing a fundamental and subharmonic frequency components, said apparatus comprising, in combination, means for filtering said voltage wave to obtain a signal at said fundamental frequency, circuit means arranged to produce two signals at said fundamental frequency but shifted in phase from each other a predetermined amount, means responsive to each of said two signals for generating a pair of square wave voltage signals having half-periods equal to the period of said fundamental frequency and displaced in time from each other the aforesaid predetermined amount, a pair of electronic switches, means for applying said composite voltage wave to said electronic switches in opposite phase, means applying said square wave voltage signals to corresponding ones of said electronic switches whereby equal portions of said oppositely phased composite voltage waves are sequentially passed by said switches, means for averaging the outputs of each of said electronic switches to produce a pair of voltage indicative of the relative amplitude of said harmonic frequency component, and an indicator arranged to provide an indication of the larger of the last-mentioned pair of voltages, said indicator being proportional to the relative amplitude of the subharmonic frequency component in said composite voltage wave independently of phase variation between said fundamental and said subharmonic frequency components.

2. Apparatus for analyzing a composite voltage wave containing a fundamental frequency F and subharmonic frequency components to determine the relative amplitude of the F/3 subharmonic comprising, in combination, means for generating a pair of unsymmetrical square wave voltages each having successive half periods equal to the period and twice the period of said fundamental frequency, respectively, and differing in phase by three-quarters of the period of said fundamental frequency, a pair of electronic switches to which said composite voltage wave is applied in opposite phase, said electronic switches being operable in response to said square wave voltages to transmit in succession unequal portions of said oppositely phased composite voltage waves, a pair of averaging circuits coupled to corresponding ones of said electronic switches, said averaging circuits each providing a signal proportional to the amplitude of the F/3 subharmonic transmitted by the electronic switch to which it is connected, and an indicator responsive to the outputs of said averaging circuits.

3. Apparatus for analyzing a composite voltage wave containing a fundamental frequency F and subharmonic frequency components to determine the relative amplitude of the F/3 subharmonic comprising, in combination, means for generating a pair of unsymmetrical square wave voltages each having successive half periods equal to the period and twice the period of said fundamental frequency, respectively, and differing in phase by three-quarters of the period of said fundamental frequency, a pair of electronic switches to which said composite voltage wave is applied in opposite phase, said electronic switches being operable in response to said square wave voltages to transmit in succession predetermined portions of said oppositely phased composite voltage waves, a pair of averaging circuits coupled to corresponding ones of said electronic switches, said averaging circuits each providing a signal proportional to the amplitude of the F/3 subharmonic transmitted by the electronic switch to which it is connected, an indicator, means for establishing a reference potential for said indicator, a mixing circuit coupling said indicator to said averaging circuits, the output of said mixing circuit being proportional to the larger of the two outputs of said averaging circuits.

4. Apparatus for determining the relative amplitude of a second subharmonic present in a complex voltage wave containing fundamental and subharmonic waves comprising, in combination, first means for altering the wave form of said complex voltage wave by inverting said wave during alternate equal time intervals corresponding to the period of said fundamental wave, second means for altering the wave form of said complex voltage wave by inverting said wave during alternate equal time intervals corresponding to the period of said fundamental wave, said time intervals of wave inversion produced by said first and second means being staggered by half the period of said fundamental wave, means for separately integrating said altered voltage waves, said last-mentioned means providing voltages proportional to the relative amplitude of said second subharmonic, and means for continuously indicating the greater voltage produced by said integrating means, said last-mentioned indication being substantially independent of phase variations between said fundamental and said second subharmonic.

5. In a system as defined in claim 4 wherein said first means for altering the wave form of said complex voltage wave comprises a first electronic switch, means for coupling oppositely phased complex voltage waves to said switch and means for applying a symmetrical square wave voltage signal having a period equal to said fundamental to said switch whereby equal portions of said oppositely phased complex waves are transmitted sequentially through said switch.

6. In a system as defined by claim 5 wherein said second means for altering the wave form of said complex voltage wave includes a second electronic switch, means for applying oppositely phased complex voltage waves to said second switch, and means for applying a symmetrical square wave voltage signal having a period equal to that of said fundamental to said second switch, said last-mentioned square wave being displaced in phase with respect to the square wave voltage coupled to said first electronic switch by one-half the period of said fundamental.

7. Apparatus for determining the relative amplitude of a third subharmonic present in a complex wave containing fundamental and subharmonic waves comprising, in combination, first means for altering the wave form of said complex voltage wave by inverting said wave during alternate unequal time intervals, said intervals corresponding to the period and twice the period of said fundamental wave, second means for altering the wave form of said complex voltage wave by inverting said wave during alternate unequal time intervals corresponding to the period and twice the period of said fundamental waves, the time intervals of wave inversion of said altered waves being staggered by three-quarters of the period of said fundamental wave, means for separately integrating said altered waves, and means for continuously indicating the larger value of said integrations, said last-mentioned value being proportional to the amplitude of the third subharmonic independently of phase variation between said third harmonic and said fundamental wave.

8. Apparatus for analyzing a nonsinusoidal voltage wave containing fundamental and subharmonic waves comprising, in combination, means for modifying the wave form of said nonsinusoidal wave in a first manner by periodically inverting said wave for a time interval equal to the period of said fundamental, said time interval commencing at a predetermined point in the cycle of alternate fundamental waves, means for modifying the wave form of said nonsinusoidal wave in a second manner by periodically inverting said wave for a time interval equal to the period of said fundamental, said last-mentioned time interval commencing at a point in the cycle of alternate fundamental waves different from said predetermined points, means for deriving first and second voltages proportional to the integral of said modified nonsinusoidal waves, and means for providing a continuous indication of the larger value of said voltages, said indication being a measure of the amplitude of a selected subharmonic wave present in said nonsinusoidal wave and being substantially unaffected by phase variations between said selected subharmonic and said fundamental wave.

9. Apparatus for determining the relative amplitude of a second harmonic present in a complex voltage wave containing fundamental and subharmonic waves comprising, in combination, first means for altering the wave form of said complex voltage wave by inverting said wave during alternate equal time intervals equivalent to the period of said fundamental wave, second means for altering a wave form of said complex voltage wave by inverting said wave during alternate equal time intervals equivalent to the period of said fundamental wave, said time intervals of wave inversion produced by said first and second means being staggered by half the period of said fundamental wave, means for deriving from said altered waves first and second signals whose amplitudes are proportional to the average amplitude of said altered waves, said first and second signals further varying in amplitude and sign in accordance with changes in the phase angle between said fundamental and said second harmonic, means for converting said first and second signals into varying amplitude unidirectional voltages, and means for providing a continuous indication of the amplitude of said first or second unidirectional voltage, depending upon which has the larger value, said last-mentioned indication being indicative of the relative amplitude of said second harmonic and being substantially independent of any phase variation between said fundamental and said second harmonic.

References Cited in the file of this patent

UNITED STATES PATENTS

| 1,933,306 | Berry | Oct. 31, 1933 |
| 1,976,481 | Castner | Oct. 9, 1934 |
| 2,159,790 | Freystedt | May 23, 1939 |
| 2,270,243 | Bach | Jan. 20, 1942 |
| 2,356,510 | Deserno | Aug. 22, 1944 |
| 2,408,048 | Deloraine | Sept. 24, 1946 |